United States Patent
Hwang et al.

(10) Patent No.: US 10,318,072 B2
(45) Date of Patent: Jun. 11, 2019

(54) INTELLIGENT PREVENTION OF UNINTENDED MOBILE TOUCH SCREEN INTERACTION

(71) Applicant: INTERNATIONAL BUSINESS MACHINES CORPORATION, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/583,556

(22) Filed: May 1, 2017

(65) Prior Publication Data

US 2018/0314387 A1 Nov. 1, 2018

(51) Int. Cl.
*G06F 3/041* (2006.01)
*G06F 3/0488* (2013.01)
*G06N 99/00* (2019.01)

(52) U.S. Cl.
CPC .......... *G06F 3/0418* (2013.01); *G06F 3/0488* (2013.01); *G06N 99/005* (2013.01)

(58) Field of Classification Search
USPC ........................................ 345/173, 156, 174
See application file for complete search history.

(56) References Cited

U.S. PATENT DOCUMENTS

| | | | |
|---|---|---|---|
| 8,015,509 B2 | 9/2011 | Karstens | |
| 8,136,053 B1 | 3/2012 | Miller et al. | |
| 8,732,624 B2 | 5/2014 | Cleron et al. | |
| 8,958,631 B2 | 2/2015 | Kutliroff et al. | |
| 2010/0097324 A1 | 4/2010 | Anson et al. | |
| 2012/0304280 A1 | 11/2012 | Hayashida | |
| 2013/0207913 A1* | 8/2013 | Takashima | G06F 3/044 345/173 |
| 2014/0267122 A1* | 9/2014 | Morton | G06F 1/169 345/173 |
| 2014/0340321 A1* | 11/2014 | Chang | G06F 3/0418 345/173 |

(Continued)

FOREIGN PATENT DOCUMENTS

| | | |
|---|---|---|
| EP | 2224693 A1 | 9/2010 |
| WO | 2014120177 A1 | 8/2014 |

OTHER PUBLICATIONS

Bitboost, "PawSense catproof your computer," [online]. Available: http://www.bitboost.com/pawsense/ [Accessed Apr. 21, 2017].

*Primary Examiner* — Thuy N Pardo
(74) *Attorney, Agent, or Firm* — Patterson + Sheridan, LLP (57) ABSTRACT

Method and system for detecting unintentional touch screen interaction. The method and system includes receiving touch data specifying information about a plurality of inputs on a touch screen, wherein the touch screen comprises a graphical user interface (GUI) comprising a first plurality of logical user interface (UI) elements. The method and system also include determining that the plurality of inputs was unintentional, based on a second plurality of logical UI elements that the plurality of inputs touch. The method and system conclude by prompting a user to verify that the plurality of inputs is intentional.

17 Claims, 6 Drawing Sheets

(56) References Cited

U.S. PATENT DOCUMENTS

| | | | |
|---|---|---|---|
| 2014/0347307 A1* | 11/2014 | Vik | G06F 3/0418 345/173 |
| 2015/0002417 A1* | 1/2015 | Baek | G06F 3/0416 345/173 |
| 2015/0029139 A1* | 1/2015 | Oshita | G06F 3/044 345/174 |
| 2015/0091878 A1* | 4/2015 | Lin | G06F 3/03545 345/179 |
| 2015/0169125 A1* | 6/2015 | Ito | G06F 3/0487 345/173 |
| 2015/0177902 A1* | 6/2015 | Chen | H04M 1/72519 345/173 |
| 2016/0070407 A1* | 3/2016 | Jeon | G06F 1/1626 345/173 |
| 2018/0101263 A1* | 4/2018 | Takashima | G06F 3/044 345/173 |

* cited by examiner

INTELLIGENT PREVENTION OF UNINTENDED MOBILE TOUCH SCREEN INTERACTION

BACKGROUND

The present disclosure relates to touch screens, and more specifically, to preventing unintentional interaction with touch screens.

Touch screens are commonly used to facilitate interaction with a variety of computers, including mobile telephones, kiosks, and laptops. Touch screens provide more flexible and intuitive methods of input, but also facilitate accidental interaction because it is easy to not realize the device is on and receiving input. Several approaches exist to approach this problem, but there is a need for improved intelligent methods to prevent accidental touch screen interaction.

SUMMARY

Embodiments of the present disclosure provide a method and system for preventing unintentional touch screen interaction. The method and system include receiving touch data specifying information about a plurality of inputs on a touch screen, wherein the touch screen comprises a graphical user interface (GUI) comprising a first plurality of logical user interface (UI) elements. Upon receiving the touch data, the method and system include determining that the plurality of inputs was unintentional, based on a second plurality of logical UI elements that the plurality of inputs touch. Finally, the method and system include prompting a user to verify that the plurality of inputs is intentional.

DETAILED DESCRIPTION

Touch screens have become increasingly popular, particularly on mobile telephones, but they are easy to accidentally or unintentionally interact with. A touch screen is a component or device which receives input from a user over an area, frequently over a screen. The touch may be sensed using resistive touch technology, capacitive sensing, acoustic sensing, infrared technology, or any other method. Additionally, though the input is generally provided on a screen which displays a user interface, the input may also be provided to an area with an image projected onto it, or may be provided to an imageless tactile sensor, such as a trackpad or touchpad.

Cell phones are frequently placed in pockets or purses, where they can be accidentally activated such that the screen begins receiving input that the user did not intend. For example, in many phones the screen turns on when a phone call is incoming. If the user does not answer the call but leaves the phone in their pocket or purse, the device often stays activated and can be accidentally interacted with by the user's pocket, purse, hands, or other items. Additionally, it is common for users to accidentally answer phone calls while the telephone is in their pocket or purse, without realizing it.

Furthermore, many cell phones have physical buttons as well as a touch screen. Often, when a physical button is pressed, the device activates and the screen begins waiting for touch input. When phones are placed in pockets or purses, it is common for other items or the users own body to accidentally press one of these buttons, allowing the screen to be interacted with when the user did not intend to do so. Regardless of how the device becomes activated such that it is ready to receive touch input, accidental touch screen interaction can be embarrassing, costly, and inconvenient. For example, a user may unintentionally text a random string of characters to somebody, or may accidentally send a picture or video that they did not intend to. Similarly, a user may unintentionally call somebody, or update their status on social media with nonsense characters. Additionally, a user may make a costly mistake by accidentally purchasing an item with one-touch ordering or a similar feature.

In addition to a user accidentally providing input to a touch screen, babies or small children often play with cell phones and other devices with touch screens. The random touches and input from a small child is closely related to unintentional input from a user's pocket, and can lead to equally problematic results. Embodiments of the present disclosure can be used to prevent such random and unintentional interaction from affecting the device by focusing on the logical user interface (UI) elements that are associated with the incoming touch input.

Figure 1:
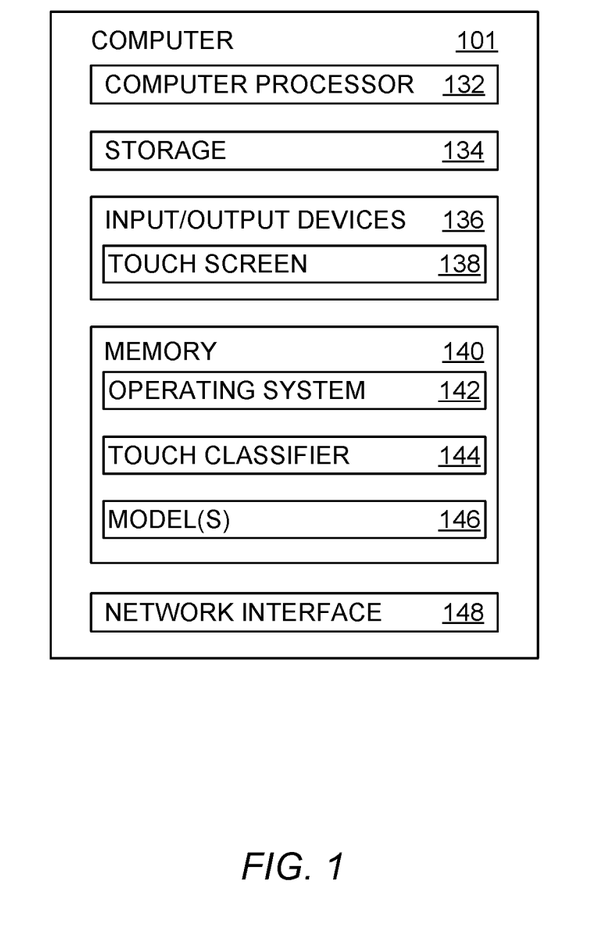
FIG. 1 illustrates a block diagram of a system configured to implement one embodiment of the present disclosure.

FIG. 1 illustrates a block diagram of a system configured to implement some embodiments of the present disclosure. Computer 101 comprises a Computer Processor 132, Storage 134, Input/Output Devices 136, Memory 140, and Network Interface 148. Not every component may be present in a given embodiment. For example, in some embodiments, Computer 101 lacks a Network Interface 148 and either does not communicate with other devices, or does so through some other means. Computer 101 may be any device capable of carrying out the present disclosure. For example, in some embodiments, Computer 101 is a mobile telephone. In some embodiments, Computer 101 is a mobile device, but in other embodiments Computer 101 is a relatively stationary machine.

Input/Output Devices 136 includes Touch Screen 138. As discussed above, Touch Screen 138 may be any type of touch screen, including capacitive, resistive, acoustic, infrared, or any other method of detecting touch input. Touch Screen 138 receives touch data, usually intentional interaction by a user. Sometimes, however, Touch Screen 138 is accidentally or randomly interacted with. Memory 140, as illustrated, contains Operating System 142, which may be any type of operating system. Memory 140 also includes Touch Classifier 144, which is used to classify incoming touch data in real time to determine whether it is intentional or not. Touch Classifier 144 is illustrated as software in Memory 140, but in some embodiments Touch Classifier 144 may be a separate hardware component, or may be implemented using firmware.

Additionally, Memory 140 contains Model(s) 146. In some embodiments, Model(s) 146 contain historic patterns of use, which can be used by Touch Classifier 144 to determine whether current input is intentional or not. In some embodiments, Model(s) 146 includes a plurality of models, and each model is associated with a specific application or program. For example, a texting program may require a different model than a social media program, because the typical intentional user interaction can vary dramatically between them. In some embodiments, however, Model 146 is program-independent, and is used to classify all incoming touch input regardless of the program or application in use. Additionally, as will be discussed below in more detail, in some embodiments Model(s) 146 refers to a threshold of valid touches to invalid touches.

Figure 2:
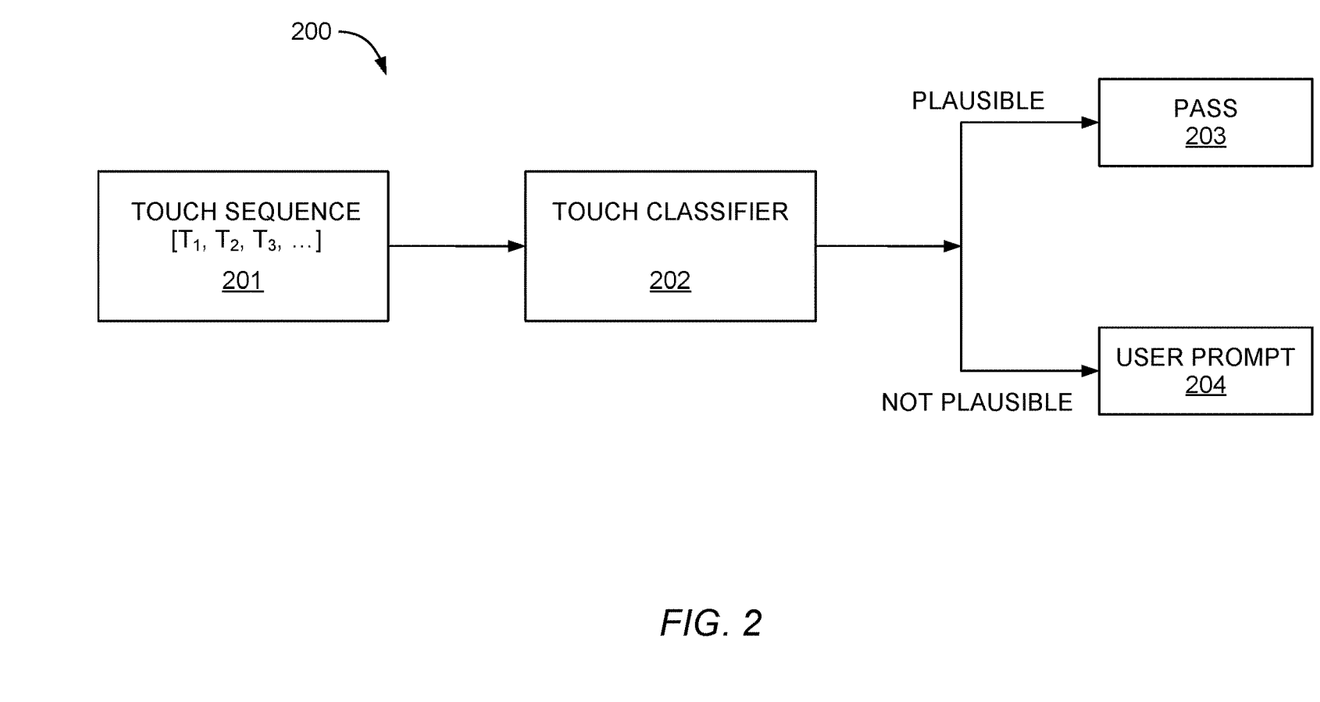
FIG. 2 is a flow diagram illustrating the process of detecting unintentional input, according to one embodiment of the present disclosure.

FIG. 2 is a flow diagram illustrating a process 200 of detecting intentional or unintentional input, according to one embodiment of the present disclosure. In the illustrated embodiment, Touch Sequence 201 is provided by a touch screen, which received the input from a user. Touch Sequence 201 includes a series of touches $T_1$, $T_2$, and $T_3$. Each of $T_1$, $T_2$, and $T_3$ contains data about a specific touch input on a touch screen. In an embodiment, each of the touches $T_1$, $T_2$, and $T_3$ is a tuple. The data included in each touch of Touch Sequence 201 may include, for example, a timestamp of when the associated touch input was received, a coordinate on the screen indicating where the touch input was received, and a specific logical user interface (UI) element that the touch input touched.

As illustrated in process 200, the Touch Sequence 201 is provided to Touch Classifier 202 as it is received from the user. Touch Classifier 202 uses historical models, machine learning, thresholds, or other methods to determine whether the Touch Sequence 201 is plausible, meaning it could have been intentional, or implausible, meaning it was likely not intentional. If Touch Classifier 202 determines that the Touch Sequence 201 is plausible, it allows the input to interact with the device and does not block the input or any further input unless it later determines that the continued input is not plausible. If, however, Touch Classifier 202 determines that Touch Sequence 201 is implausible, a User Prompt 204 is provided to the user, so that a user may verify that the input was intentional. This verification may take many forms. In some embodiments, the user must input a personal identification number (PIN) before proceeding. In other embodiments, the user may be prompted to input a pattern. This pattern may be predefined or the user may be prompted to trace a pattern displayed on the screen. In some embodiments, the user may be asked to enter a predefined password, or they may be asked to type a word or phrase that is generated randomly or pseudo-randomly.

In an embodiment, once Touch Classifier 202 determines that a Touch Sequence 201 is implausible, it prevents any further touches from interacting with the device until the User Prompt 204 is satisfied. In some embodiments, the series of touches that led up to the determination that the Touch Sequence 201 was unintentional have already been allowed to interact with the device and make changes, such as pressing icons on the logical UI or entering text, and it is only the last touch and all future touches that are blocked. In some embodiments, however, there is a slight delay from a user providing touch input to the input affecting the device. For example, touches in a Touch Sequence 201 may be held in a buffer for a short period of time, until Touch Classifier 202 determines that the Touch Sequence 201 is intentional. This may prevent even the first few unintentional touches from interacting with the device, rather than allowing some unintentional interaction before stopping it.

In some embodiments, all touch input is allowed to interact with the device, but some or all of the touches may be reversed or "rolled back" when Touch Classifier 202 determines that the Touch Sequence 201 was unintentional. For example, a touch in Touch Sequence 201 may cause a program to be opened. When another touch is received in Touch Sequence 201 that triggers Touch Classifier 202, the program may be closed because Touch Classifier 202 determines that the initial touch which opened the program was not intentional either.

In some embodiments, Touch Sequence 201 includes any touches that occur within a period of time. This period of time may be defined by a user, or may be preprogrammed. In some embodiments the period of time is adjusted algorithmically based on machine learning from historic touch patterns. For example, Touch Classifier 202 may learn that a user typically provides touch input in a series of Touch Sequences 201, where each Touch Sequence spans a certain period of time. In some embodiments, the period of time may vary based on the specific Touch Sequence 201 being provided. For example, Touch Classifier 202 may learn that some sequences take a certain period of time, while other sequences take other periods of time to complete. When Touch Classifier 202 notices a series of touch inputs match a historic pattern, it may extend Touch Sequence 201 until the historic pattern is completed or deviated from. In this way, Touch Classifier 202 can intelligently adjust its classifications and determinations based on user input.

In embodiments where Touch Sequence 201 covers a period of time, Touch Classifier 202 may consider all touches that were received in the last ½ second, five seconds, or any other period of time. In some embodiments, Touch Sequence 201 is a rolling period of time which includes all touches received in the last period of time. In other embodiments, each Touch Sequence 201 may cover a discrete period of time, with a new Touch Sequence 201 beginning ever ½ second, five seconds, or any other period of time.

In some embodiments, Touch Sequence 201 includes a defined number of touches. In some embodiments, Touch Sequence 201 is a rolling block that includes the previous five, ten, twenty, or any other number of touches. In other embodiments, Touch Sequence 201 may include a defined number of touches, and a new Touch Sequence 201 may begin when the last one has reached the defined number. This number may be defined by the user or preprogrammed. Additionally, the number of touches included in a single Touch Sequence 201 may be defined algorithmically or through machine learning. For example, Touch Sequence 201 may include more or fewer touches based a user's historic use of the device. In some embodiments, Touch Classifier 202 may use machine learning to learn that some historic patterns comprise a set number of touches, while others comprise differing numbers. In such an embodiment, Touch Sequence 201 may be stretched to include extra touches or reduced to include fewer touches when Touch Classifier 202 determines that the incoming touch input matches the historical pattern.

In some embodiments, the series of touches that are received just after the device is activated are most important when determining intent. For example, when a user has been using a device intentionally, it is less likely that the next input will be unintentional. Conversely, if the screen has just been activated, or the touch surface has just begun receiving input, it may be much more likely that the input is unintentional because no other intentional input has preceded it. In such an embodiment, Touch Classifier 202 may be more strict with is plausibility determination, and thus may be more likely to determine that input was unintentional than if the same Touch Sequence 201 was received after a period of intentional interaction by a user.

Similarly, when a device is active and ready to receive input, a series of touches that is preceded by a relatively long pause with no touch input, such as several seconds or several minutes, may be more likely to be unintentional, and thus may deserve extra scrutiny. For example, a user may begin providing intentional input, but may pause to think, or may get distracted by something. During this pause in input, accidental interaction may occur because the user sets the device down, walks away temporarily, or accidentally bumps the device while doing something else like greeting another person. In such an embodiment, Touch Classifier 202 may be more likely to determine that input was unintentional when it is received after a relatively long pause than if the same Touch Sequence 201 was received after a relatively shorter pause or in the middle of intentional interaction by a user.

Figure 3:
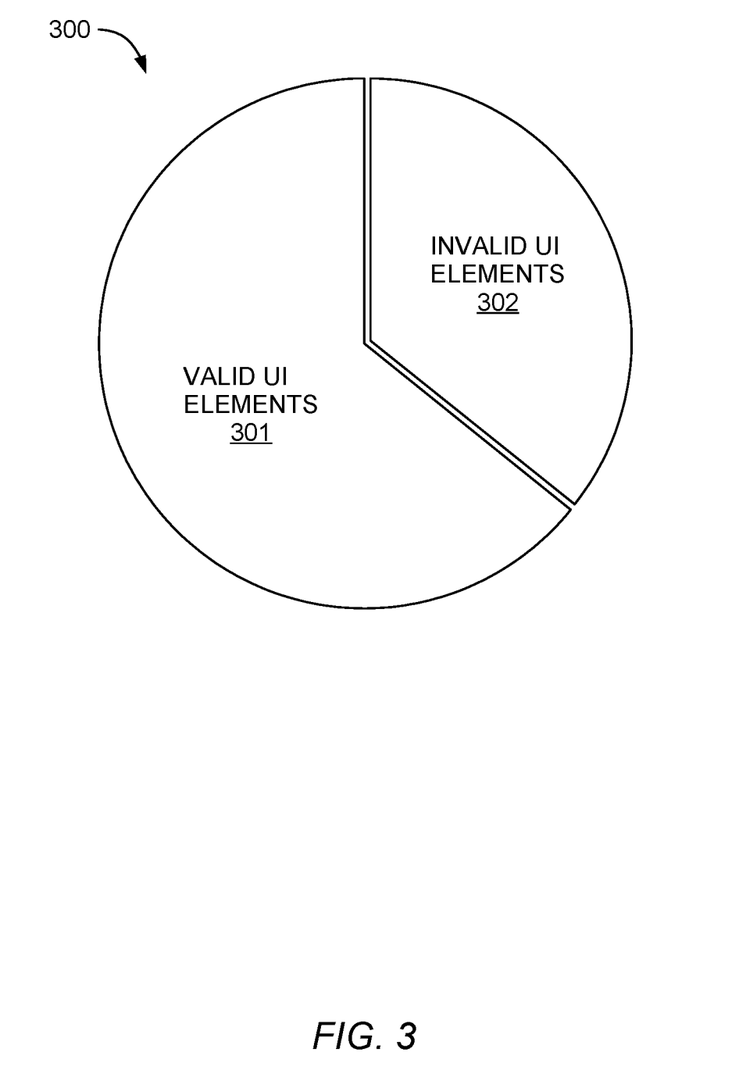
FIG. 3 is a chart illustrating a method of detecting unintentional input, according to one embodiment of the present disclosure.

FIG. 3 is a chart 300 illustrating a method for detecting and preventing unintentional touch screen interaction, according to one embodiment of the present disclosure. In some embodiments, Touch Classifier 202 considers the ratio of valid to invalid touches on the touch screen, and triggers a user prompt when the ratio exceeds a threshold. In such an embodiment, valid touches means touch input which touches or is associated with a valid logical UI element such as a button, an icon, a slider, a link, or other logical UI element. The term "valid" indicates that the associated input touched a component of the logical UI that is configured to respond to a user's touch in some predefined manner. For example, a valid logical UI element may launch an application when touched, may enter a keystroke on a virtual keyboard, trigger a pop-up, change tabs in a browser, or any other event responsive to receiving input from a user. Further, "invalid" touch means a touch that did not touch a defined logical UI element that is configured to respond to the touch, but instead simply touched empty space between logical elements or some other area that is not designed to be touched or interacted with at the moment.

Additionally, a user input "touches" or is associated with a specific UI element when the coordinates of the input coincide with the coordinates of the relevant UI element. For example, if the corners of a particular UI element are delineated by the coordinates (0,0), (0,10), (10,0,) and (10,10), a user input would "touch" that element if it occurred anywhere within the UI coordinates. For example, if the user input coordinate is (5,5), it occurred within the bounds of the UI element, and is therefore associated with that element. In some circumstances, a user input may not "touch" a specific UI element, but instead touches a coordinate that is not a part of any defined element. In some embodiments, the fact that the touch did not correspond to a defined UI element means that the input was therefore an invalid touch.

The threshold that determines whether the input is intentional or not may be defined by a user, or may be preprogrammed. Additionally, in some embodiments, the threshold may be set programmatically or algorithmically, or according to machine learning from prior use. In some embodiments, the threshold is the same for all programs or applications. In other embodiments, the threshold varies between programs and applications. For example, the threshold may be higher for social media applications than for texting applications. As illustrated in FIG. 3, the current Touch Sequence 201 contains more Valid UI Elements 301 than Invalid UI Elements 302. Thus, the current ratio is more than 50%. If the threshold was set to 50%, then as soon as the Touch Sequence 201 contained more invalid UI touches than valid UI touches, the user would be prompted to verify that the input was intentional.

Figure 4:
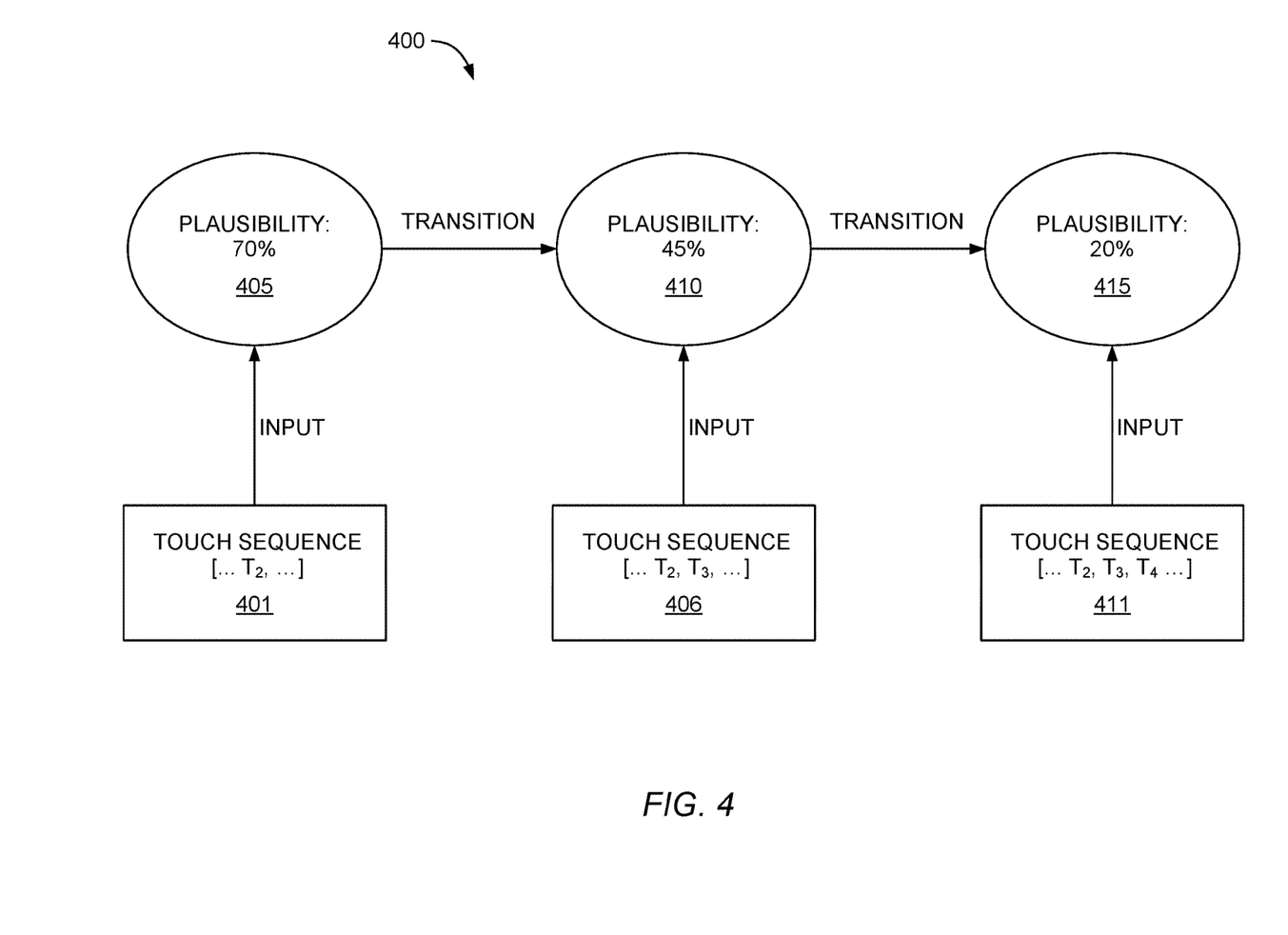
FIG. 4 is a probabilistic automata used to detect unintentional input, according to one embodiment of the present disclosure.

FIG. 4 is a Probabilistic Automata 400 or finite state machine used to detect unintentional input, according to one embodiment of the present disclosure. In some embodiments, Touch Classifier 202 uses machine learning to determine whether the input is intentional or not. For example, the Touch Classifier 202 could use a probabilistic state transition model such as a Markov Chain or hidden Markov model, support vector machine, deep neural network, or any other machine learning. In some embodiments, the model is constructed entirely from data from the actual user or users of the device. In other embodiments, the model starts with a base model constructed from generic or typical user input. In such an embodiment, the model is refined and trained by input data from the actual user or users of the device.

The Automata illustrated in FIG. 4 represents a part of a Markov process, where each oval represents a discrete state. The automata moves between states based on the input received from the touch screen. In some embodiments, the automata continues running until the plausibility reaches a certain threshold, at which point the user is prompted and the automata begins again. In some embodiments, the automata may continue until the plausibility reaches a certain level and the input is considered to be confirmed intentional, at which point the automata may restart with fresh input.

As illustrated, the Automata 400 begins at state 405, indicating that there is a 70% chance that the input being received is intentional. Although no state is depicted prior to state 405, there of course may be one or many states that the machine was in before arriving at its present state. As depicted, Touch Sequence 401's most recent touch data, $T_2$, is provided to the Touch Classifier 202. Upon receiving this input, the model transitions along the arrow to State 410, where the plausibility of the input is only 45%. That is, the probability that the input is intentional has dropped from 70% to 45%. Touch Sequence 406 then adds $T_3$ as the next received touch data, which triggers a transition to state 415, where the plausibility of the input is only 20%. Although a simple three-state one-way chain is depicted, there could be many other states in the automata. Additionally, the plausibility of the input may improve as more input is received. For example, from state 410, the automata may have moved back to state 405 (with 70% plausibility) had input $T_X$ been received. The automata depicted is created using machine learning, where the user's previous use of the phone shape the model and adjust its states and transitions.

As discussed above, in some embodiments there are different models or automata for each application or program that the user uses. In some embodiments, however, there is a single model that is applied regardless of what application is in use. The number of models employed does not affect the functioning of the present disclosure. In an embodiment, regardless of the machine learning technique applied, the focus of the Touch Classifier 202 is on the logical UI elements that each touch contacts. For example, if a user usually opens email within a few seconds of turning on his phone, scrolls down for a moment, and then presses a back button, the Touch Classifier 202 can learn this as a historical pattern. If the user, intentionally or accidentally, turns on his phone and opens email, but then attempts to scroll side to side, or scroll up, the Touch Classifier 202 may determine that this abnormal behavior is unintentional.

Similarly, if Touch Classifier 202 receives touch data indicating that the user is repeatedly opening and closing apps, it may determine that the input is unintentional because it has used machine learning to recognize that when the user opens an application, he or she does not usually immediately close it. Furthermore, when a user does so, they may rarely go on to open and close another application or the same application again. Thus, this pattern of input is recognized as unintentional, and the Touch Classifier 202 may prompt the user to verify that it was, in fact, intentional.

Figure 5:
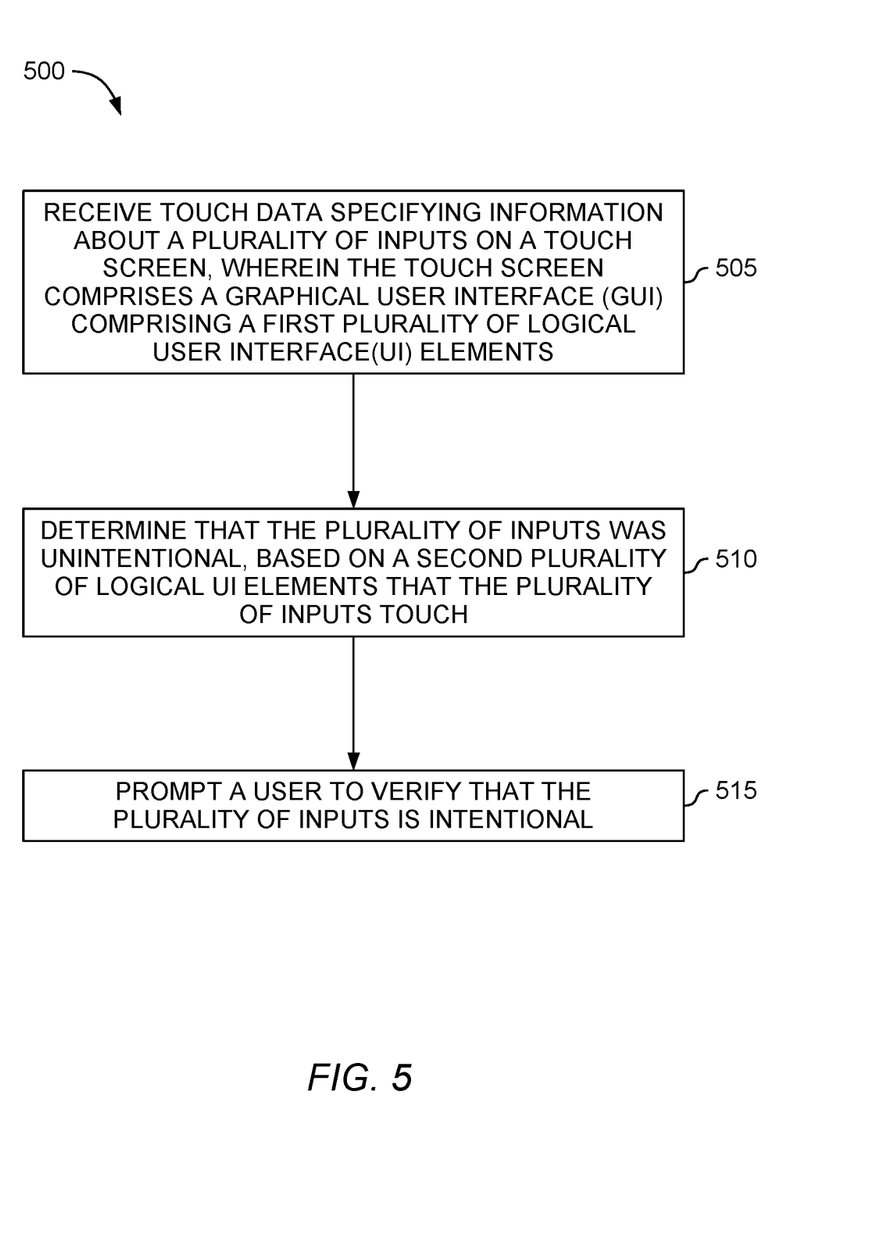
FIG. 5 is a flow diagram illustrating a method for preventing unintentional touch screen interaction, according to one embodiment of the present disclosure.

FIG. 5 illustrates a flow diagram of a method 500 of carrying out one embodiment of the present disclosure. The method 500 begins at step 505, where the Touch Classifier 202 receives touch data specifying information about a plurality of inputs on a touch screen, wherein the touch screen comprises a graphical user interface (GUI) comprising a first plurality of logical user interface (UI) elements. The method 500 continues to step 510, where the Touch Classifier 202 determines that the plurality of inputs was unintentional, based on a second plurality of logical UI elements that the plurality of inputs touch. Finally, the method 500 moves to step 515, where the device prompts a user to verify that the plurality of inputs is intentional.

Figure 6:
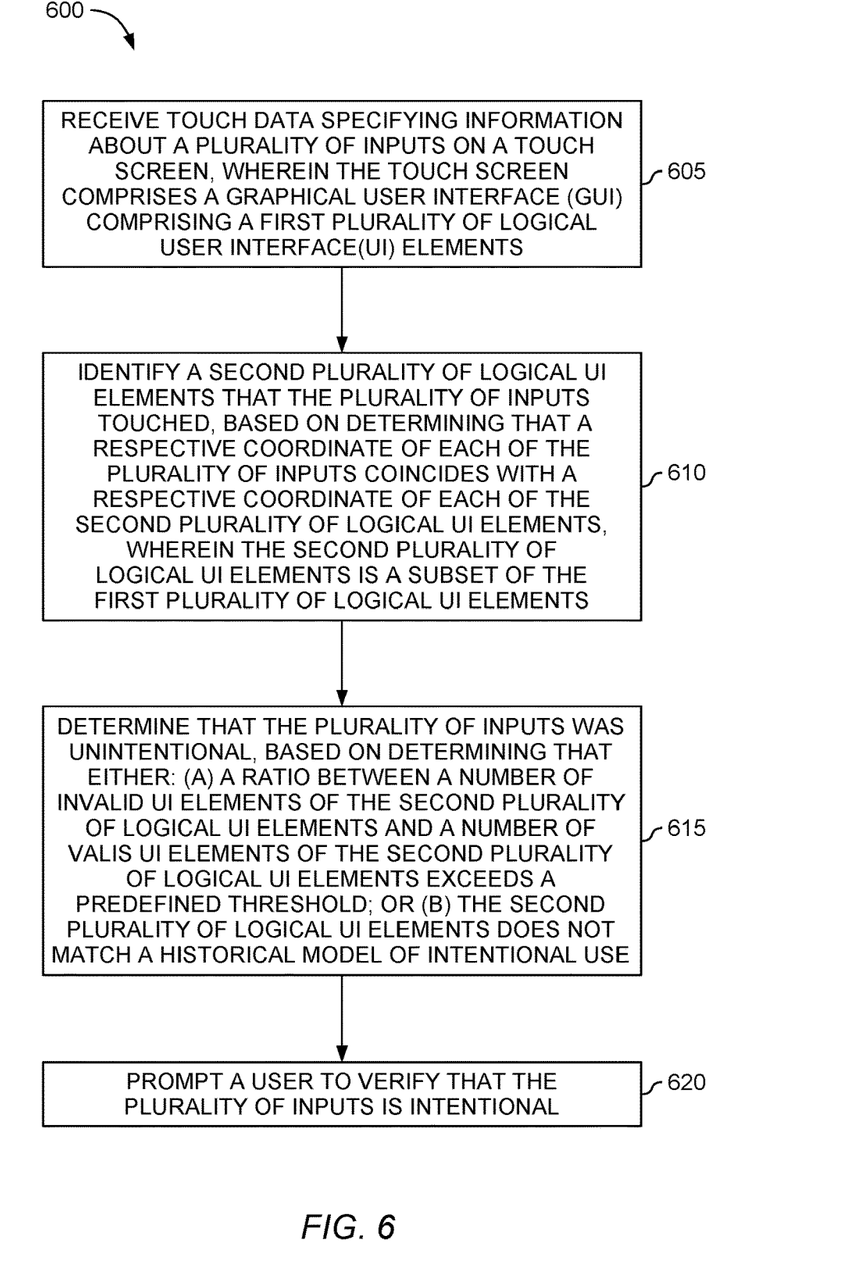
FIG. 6 is a flow diagram illustrating a method for preventing unintentional touch screen interaction, according to one embodiment of the present disclosure.

FIG. 6 illustrates a flow diagram of a method 600 of carrying out one embodiment of the present disclosure. The method 600 begins at step 605, where Touch Classifier 202 receives touch data specifying information about a plurality of inputs on a touch screen, wherein the touch screen comprises a graphical user interface (GUI) comprising a first plurality of logical user interface (UI) elements. The method 600 continues at step 610, wherein the Touch Classifier 202 identifies a second plurality of logical UI elements that the plurality of inputs touched, based on determining that a respective coordinate of each of the plurality of inputs coincides with a respective coordinate of each of the second plurality of logical UI elements, wherein the second plurality of logical UI elements is a subset of the first plurality of logical UI elements. The method 600 then continues to step 615, where the Touch Classifier 202 determines that the plurality of inputs was unintentional, based on determining that either: (a) a ratio between a number of invalid UI elements of the second plurality of logical UI elements and a number of valid UI elements of the second plurality of logical UI elements exceeds a predefined threshold; or (b) the second plurality of logical UI elements does not match a historical model of intentional use. Finally, the method 600 finishes at step 620, where the device prompts a user to verify that the plurality of inputs is intentional.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the present disclosure, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of detecting unintentional touch screen interaction, the method comprising:
   receiving touch data specifying information about a plurality of inputs on a touch screen, wherein the touch screen comprises a graphical user interface (GUI) comprising a first plurality of logical user interface (UI) elements;
   determining that the plurality of inputs was unintentional, based on a second plurality of logical UI elements that the plurality of inputs touch, comprising determining that a ratio between a number of touches on invalid UI elements and a number of touches on valid UI elements exceeds a predefined ratio threshold, wherein valid UI elements are UI elements that are configured to respond to input from a user, and invalid UI elements are UI elements that are not configured to respond to input from the user; and
   prompting the user to verify that the plurality of inputs is intentional.

2. The method of claim 1, wherein the touch data comprises a coordinate of an associated input, a timestamp of when the associated input occurred, and a logical UI element that the associated input touched, wherein the logical UI element that the associated input touched is determined based on the coordinate of the associated input and a coordinate of the logical UI element.

3. The method of claim 2, wherein the predefined ratio threshold is set by the user.

4. The method of claim 2, wherein a probabilistic automaton is used to determine that the plurality of inputs was unintentional.

5. The method of claim 4, wherein the probabilistic automaton is a Markov chain.

6. The method of claim 2, wherein a support vector machine is used to determine that the plurality of inputs was unintentional.

7. The method of claim 2, wherein machine learning is used to create a plausibility model to determine that the plurality of inputs was unintentional.

8. The method of claim 7, wherein the plausibility model is unique to a specific program application.

9. The method of claim 7, wherein the plausibility model is applicable to any program.

10. The method of claim 1, wherein the touch data comprises a plurality of tuples.

11. A system, comprising:
one or more computer processors; and
a memory containing computer program code that, when executed by operation of the one or more computer processors, performs an operation comprising:
receiving touch data specifying information about a plurality of inputs on a touch screen, wherein the touch screen comprises a graphical user interface (GUI) comprising a first plurality of logical user interface (UI) elements;
determining that the plurality of inputs was unintentional, based on a second plurality of logical UI elements that the plurality of inputs touch, comprising determining that a ratio between a number of touches on invalid UI elements and a number of touches on valid UI elements exceeds a predefined ratio threshold, wherein valid UI elements are UI elements that are configured to respond to input from a user, and invalid UI elements are UI elements that are not configured to respond to input from the user; and
prompting the user to verify that the plurality of inputs is intentional.

12. The system of claim 11, wherein the touch data comprises a coordinate of an associated input, a timestamp of when the associated input occurred, and a logical UI element that the associated input touched, wherein the logical UI element that the associated input touched is determined based on the coordinate of the associated input and a coordinate of the logical UI element.

13. The system of claim 12, wherein a probabilistic automaton is used to determine that the plurality of inputs was unintentional.

14. The system of claim 12, wherein machine learning is used to create a plausibility model to determine that the plurality of inputs was unintentional.

15. A computer program product for resource pooling, the computer program product comprising:
a computer-readable storage medium having computer-readable program code embodied therewith, the computer-readable program code executable by one or more computer processors to perform an operation comprising:
receiving touch data specifying information about a plurality of inputs on a touch screen, wherein the touch screen comprises a graphical user interface (GUI) comprising a first plurality of logical user interface (UI) elements;
determining that the plurality of inputs was unintentional, based on a second plurality of logical UI elements that the plurality of inputs touch, comprising determining that a ratio between a number of touches on invalid UI elements and a number of touches on valid UI elements exceeds a predefined ratio threshold, wherein valid UI elements are UI elements that are configured to respond to input from a user, and invalid UI elements are UI elements that are not configured to respond to input from the user; and
prompting the user to verify that the plurality of inputs is intentional.

16. The computer program product of claim 15, wherein the touch data comprises a coordinate of an associated input, a timestamp of when the associated input occurred, and a logical UI element that the associated input touched, wherein the logical UI element that the associated input touched is determined based on the coordinate of the associated input and a coordinate of the logical UI element.

17. The computer program product of claim 16, wherein machine learning is used to create a plausibility model to determine that the plurality of inputs was unintentional.

* * * * *